(12) United States Patent
Torres

(10) Patent No.: US 6,920,027 B1
(45) Date of Patent: Jul. 19, 2005

(54) FAST, VARIABLE, AND RELIABLE POWER SYSTEM CONTROLLER DESIGN

(76) Inventor: Felix Torres, 12120 SW. 97 Ter., Miami, FL (US) 33186

(*) Notice: Subject to any disclaimer, the term of this patent is extended or adjusted under 35 U.S.C. 154(b) by 410 days.

(21) Appl. No.: 10/292,016

(22) Filed: Nov. 12, 2002

(51) Int. Cl.$^7$ ................................................ H02H 7/00
(52) U.S. Cl. ........................... 361/58; 361/93.9; 361/19
(58) Field of Search ............................. 361/19, 58, 93.9

(56) References Cited

U.S. PATENT DOCUMENTS

| | | | | |
|---|---|---|---|---|
| 2,600,303 A | * | 6/1952 | Kovalsky | 318/271 |
| 2,953,740 A | * | 9/1960 | Perkins, Jr. et al. | 323/253 |
| 4,490,769 A | | 12/1984 | Boenig | 361/58 |
| 5,278,380 A | * | 1/1994 | Lowry | 219/635 |
| 5,530,613 A | | 6/1996 | Bauer et al. | 361/58 |
| 5,694,279 A | * | 12/1997 | Mumford | 361/19 |
| 5,723,915 A | | 3/1998 | Maher et al. | 307/131 |
| 5,930,095 A | | 7/1999 | Joo et al. | 361/58 |
| 6,034,855 A | * | 3/2000 | Bishop | 361/58 |
| 6,335,851 B1 | * | 1/2002 | Nishidai et al. | 361/58 |
| 6,337,785 B1 | | 1/2002 | Okazaki | 361/19 |
| 6,433,660 B1 | | 8/2002 | Saravolac | 335/216 |
| 6,437,960 B1 | | 8/2002 | Chen et al. | 361/103 |
| 6,664,875 B2 | * | 12/2003 | Yuan et al. | 335/216 |

* cited by examiner

Primary Examiner—Ronald Leja

(57) ABSTRACT

A power system controller design for controlling fault current or load flow current by applying a variable inductive impedance. The device comprising multiple stages of transformers connected such that their primary coils are in series and carry the primary power. Their secondary circuits containing a device for interruption of secondary current. The secondary circuit of each stage having a small part of the primary energy flowing through them. Under normal conditions the interrupter allows secondary current to flow, producing no impedance on primary side. Upon operation of interrupter, inductive impedance appears across primary. Operation of single stages producing low inductive impedance on primary circuit. Operation of multiple stages producing higher inductive impedance on primary circuit. In a preferred embodiment, the transformers have saturating cores such that operation of single stages saturates their cores, producing low inductive impedance on primary circuit. Operation of multiple stages brings the individual cores back out of saturation, producing higher inductive impedance across primary. Also in a preferred embodiment, to form a stage the secondary circuits of an identical transformer pair are connected in parallel via an interrupting device. Normally, current flowing in the secondary of the first transformer is re-introduced into the primary via the second transformer. Upon operation of interrupter, inductive impedance appears across primary coils of both transformers.

24 Claims, 3 Drawing Sheets

FIG. 1  A CONTROLLER STAGE UTILIZING A TRANSFORMER PAIR
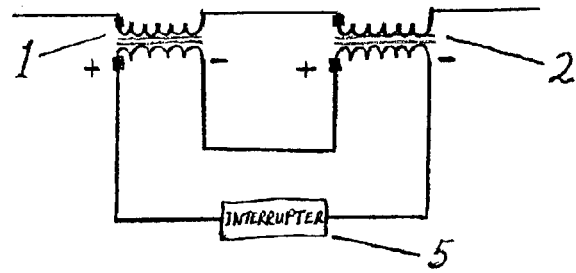
FIG. 1A  TYPICAL INTERRUPTER
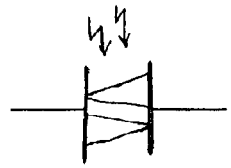
FIG. 2  A CURRENT CONTROLLER WITH STAGES OF THE TYPE IN FIG. 1
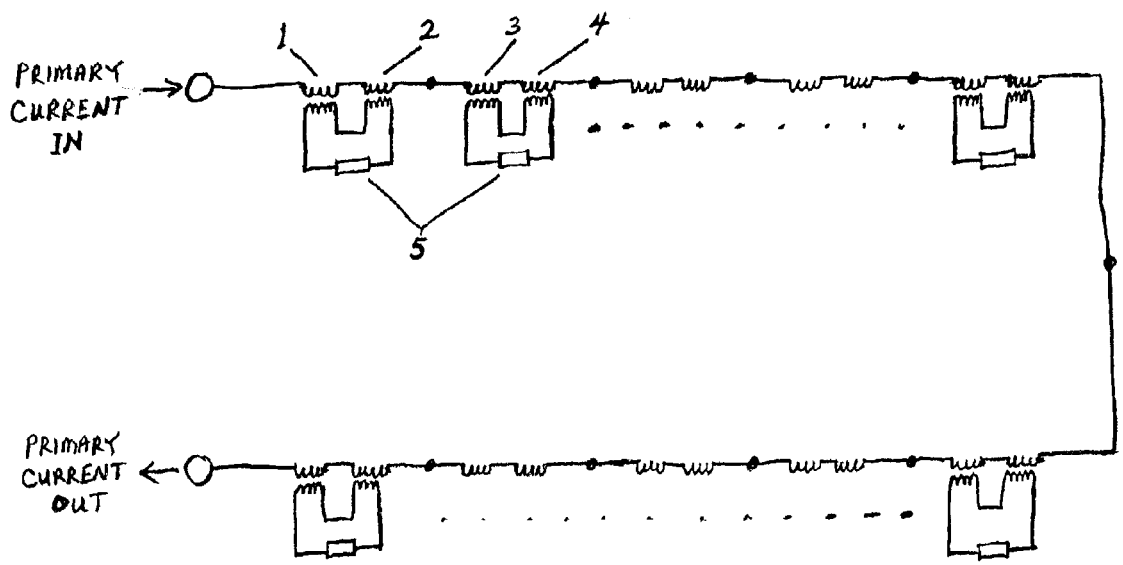

FIG. 3 TYPICAL TRANSFORMER PAIR ARRANGEMENT
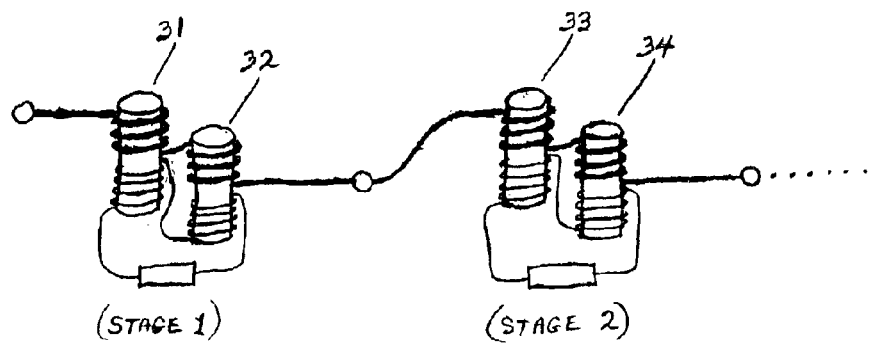
FIG. 4 A CONTROLLER STAGE UTILIZING SINGLE TRANSFORMER
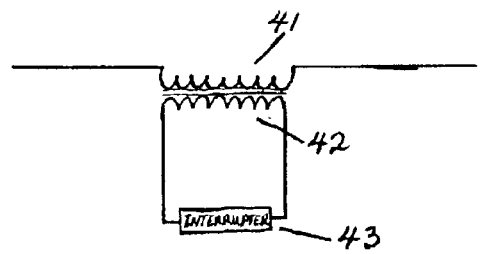
FIG. 5 A CURRENT CONTROLLER WITH STAGES OF THE TYPE IN FIG. 4
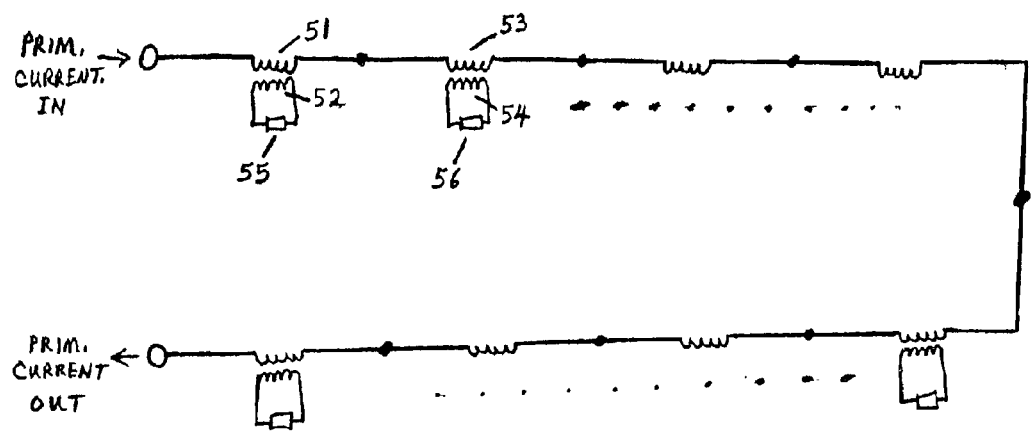

FIG. 6      TYPICAL SINGLE TRANSFORMER ARRANGEMENT
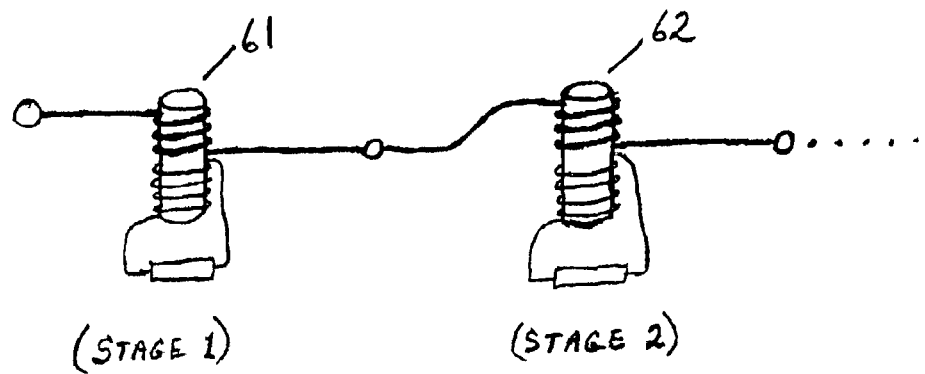
(STAGE 1)          (STAGE 2)
FIG. 7      WINDINGS OF AN AIR CORE TRANSFORMER
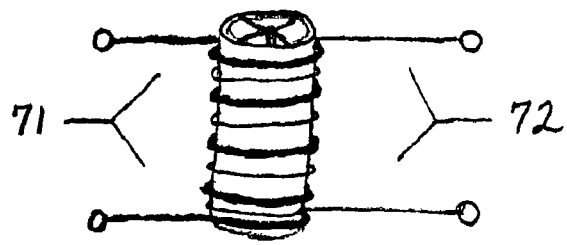

FAST, VARIABLE, AND RELIABLE POWER SYSTEM CONTROLLER DESIGN

FEDERALLY SPONSORED RESEARCH

Not Applicable

SEQUENCE LISTING OR PROGRAM

Not Applicable

BACKGROUND

1. Field of invention

This invention relates to high voltage power system current controllers, specifically to fault current or load flow current controllers, by applying a variable inductive impedance.

BACKGROUND

2. Description of Prior Art

High voltage power systems of the future will have distributive generation systems of many different types that are more sensitive to overloads and surges. Use of better conducting wire will lessen system resistance and provide more current during disturbances, etc. When faults occur, we will get more damage at the fault and possibly more damage to sensitive generation and delivery equipment. Customer's loads have equipment that is more sensitive to surges and sympathetic voltage dips, so the duration of any disturbance will be critical. Loads will continue to increase and economics may require systems to operate at optimal limits, where loss of a piece of equipment or any kind of extended outage of any equipment or line may not be acceptable. Also, if we reduce the damage during a fault or overload, at the fault or to equipment, then that section may be restored sooner.

In existing systems of today we have intelligent relays and equipment that can sense overloads and surges very quickly and make decisions very quickly. However, their outputs usually operate a very big and slow circuit breaker which can only perform one function regardless of the disturbance. Circuit breaker operation is usually delayed to ensure we don't have a false alarm or to coordinate with other devices in the circuit, again because the breaker has such an abrupt action of interrupting everything. Further, if one of these circuit breakers fail or cannot be closed back in we may suffer an extended outage or load flow problem.

Some improvements would be gained by using a current limiter. This device limits the amount of current flowing through it for a short time until interrupters are opened or some other decision is made to by-pass the disturbance.

Prior art describe variable inductor type of current limiters, i.e. U.S. Pat. No. 5,930,095. On these the inductance can be varied by magnetizing the core through another source and changing its saturation level. The values of inductance in such a device can be very limited. It can be considered slow to react from one state to another and requires a continuous source of bias current to saturate the core under normal conditions.

Some newer technology patents such as U.S. Pat. Nos. 4,490,769, 6,337,785, 6,433,660, and 6,437,960 describe current limiters, employing a combination of semiconductor devices, PTC's, superconductor devices, and/or inductor coils. These types of limiters usually rely on the semiconductor, PTC, or superconductor to carry the full amount of the normal load current and when called upon to act under a high current fault condition for these devices to shunt away the current into an inductive coil or to become more resistive. Therefore, the devices have to be larger and slower. If one fails or does not return back to normal after operation, it does not allow normal current flow. Also, they can become excessively hot and this can affect their characteristics over time.

These "current limiter" types of current controllers that are described above are normally used to limit current in case of faults. They usually do it by switching from normal to one value of fixed impedance and can only withstand the fault current for a short period of time. Any controllers that can control or limit load flow usually suffer from similar deficiencies as the current limiters. For instance, controllers described in U.S. Pat. Nos. 5,530,613 and 5,723,915 have to have larger and good heat dissipating components. Also, if one of these components fail there could be current flow problems or the controller may not work.

In conclusion, the current controllers described above lack several things that could be very advantageous. Things such as: the ability to vary the impedance to different amounts depending on the disturbance, the ability to carry the overload for a longer period of time especially for load flow control, the ability to allow maintenance or repair/ replacement of more sensitive components without having to take the whole device out of service, and, again, the ability to operate very fat and to continue functioning if one of these sensitive components fails.

OBJECTS AND ADVANTAGES

The ideal power system controller should be flexible enough to achieve a couple of things. It should be a very fast and reliable circuit protector during faults and it should be able to control load flows in different circuits when disturbances occur such as loss of delivery lines or power generation. It is the object of this invention to describe a power system controller design that achieves the above with many advantages over the present art.

By using a design with multiple stages in series we take energy out of the power system (or provide impedance) little by little. By using a transformer type of design we provide isolation between primary conductor and secondary interrupting circuit. Each secondary interrupting circuit deals with just a small amount of the primary energy, therefore the interrupter can be smaller and faster. As the secondary interrupters open up we put some inductive impedance on the primary circuit.

Using multiple small transformers with few windings and saturable cores we saturate the cores of any interrupters that operate first and therefore reduce the burden on them. As the other stages interrupt we bring these stages back out of saturation and they are able to provide more impedance. As the later stages interrupt there is already enough impedance from the rest of the stages to not cause any interruption problems there. In the process of going back to normal the reverse takes place just as described above and again no problems. With this design, if one or two of the interrupters fail to open, their transformers saturate and the controller should function almost normal with the remaining stages.

With this design we can provide variable impedance in response to different system disturbances. We can sequentially interrupt the stages as the energy sensed goes up so that for false alarms only a few stages operate and don't have much affect. We can therefore start operating extremely fast without worrying about false alarms.

By using inductive type of impedance we slow down the rising of current flow and there is very little resistance to cause overheating and component damage. By having several stages with smaller transformers any heating or stress is spread out to each transformers and dissipated a lot better. Also, with few windings in each transformer mechanical forces in each are much less and require less restraint. For this reason this controller can handle higher currents for extended periods of time without any problems.

Another advantage to this configuration is that surge protection or arrestors on the secondary side could dissipate high frequency transients in individual stages. Also, inductive energy stored in the transformers could be dissipated on the secondary side before total interruption of flow and inductive kick-back occurs on the primary side. Built into this design is the ability to allow for isolation for any repairing, replacements, or testing of sensitive components on the secondary side without taking the controller out of service or taking any kind of outage. With the strict requirements on the system in the future this could be a tremendous advantage.

SUMMARY

In summary, the present invention consists of a design of a power system controller that, in effect, provides a fast and reliable varying impedance to the power system to control disturbances such as faults or excessive load flow due to loss of delivery lines or for islanding generation. This is achieved using several stages of few winding transformers connected such that their primary coils are in series and carry the primary power. Their secondaries have small chunks of the primary energy flowing through them and, as such, can be manipulated easier. Changes in individual stages have minimal affect on the whole device or what it controls. Operation of multiple stages have a bigger affect on what it controls. In conclusion, we have a very fast responding, reliable, and flexible device for controlling the power system.

BRIEF DESCRIPTION OF THE DRAWINGS

Drawing Figures

FIG. 1 is a stage of a controller utilizing a transformer pair, where first transformer and second transformer would be identical and would have few windings on the primary coils 11 & 12. Their secondaries would have secondary coils 13 and 14 and would be connected with the polarities shown. It would have a current interrupter 15 connected as shown to interrupt secondary current.

FIG. 1A is a photo-coupled TRIAC used as the interrupter.

FIG. 2 is a typical design of a current controller, where transformers 21 & 22 have to be identical to each other and transformers 23 & 24 have to be identical to each other, and likewise in the rest of the transformer pairs the first transformer has to be identical to the second. All transformers in this design will have few primary windings and will be connected with the polarities shown in FIG. 1. Interrupters 25 & 26 can be, but do not have to be, the same.

FIG. 3 is a representation of typical transformers used in a pair and how they could interconnect. A saturable or non-saturable core has primary and secondary windings on it and wound in such a way to achieve good magnetic coupling between them. The two cores of a transformer pair are identical and so cores 31 & 32 are identical and cores 33 & 34 are identical, etc.

FIG. 4 is a stage of a controller utilizing single transformers for each. Each transformer would have primary coil 41 and secondary coil 42. An interrupter 43 would be connected across secondary.

FIG. 5 is a controller design utilizing single transformers for stages. Primary coil 51 and secondary coil 52 constitute the transformer for stage 1. Primary coil 53 and secondary coil 54 constitute the transformer for stage 2. Transformers for stage I and stage 2 do not have to be identical and likewise for the rest of the transformers. Interrupters 55 and 56, or the rest, do not have to be identical either.

FIG. 6 is a representation of single transformers used in a stage and how they could interconnect. Saturating or non-saturating cores 61 and 62 can be, but do not have to be, the same.

FIG. 7 is a representation of a typical air core transformer where the primary coil 71 and the secondary coil 72 have to be interlaced to achieve good magnetic coupling between them.

DETAILED DESCRIPTION

Description—Preferred Embodiment

A preferred embodiment of the present invention is illustrated in FIGS. 1, 1A, 2 & 3. In this embodiment we start with small saturable core transformers with good coupling from primary to secondary. The primary will have very few windings. The number of secondary windings that are used dictate the ratio of current to voltage that the secondary circuit will see. Transformer pairs with exactly the same number of windings (prim & sec) are connected with their primaries in series and their secondaries in parallel such that their secondary polarities are opposite each other. This makes up one stage as shown in FIG. 1. The core of each transformer should not interact with any of the others. In the secondary circuit we put a fast acting low power A.C. current interrupting or limiting device. The interrupting or limiting device could be a switch, a semiconductor, a heat or light activated device, a variable resistance (PTC), a superconductor, or any combination thereof In the preferred embodiment, however, it would be a semiconductor. Namely, it would be a photo-coupled TRIAC (FIG. 1A) activated via fiber optics. From here on in it is referred to as the interrupter.

Another pair of identical. transformers connected in a circuit with the same characteristics as the previous one is connected with primaries in series with the previous pair. Each pair is considered as one stage of a multistage circuit. In FIG. 2, ten of these transformer pairs are connected in series to form a controller circuit, however, the actual number used depends on the application and how much power limiting is desired.

Operation—Preferred Embodiment

Under normal conditions the device would be in a power system circuit with load flowing thru it and no part of the controller activated. The interrupters would all be closed or conducting and the current flowing through the primary of the first transformers in the pair would be diverted through their secondary circuit and re-introduced to the primary through the second transformer in the pairs. Each transformer pair would do the same and therefore there would be no inductive impedance to the whole controller circuit.

When there is a disturbance or high current condition or whenever the device is called upon to operate, the interrupter would try to stop the secondary current flow and thus keep the current from being re-introduced to the primary via the second transformer. Now the primary of both transformers appear as inductors. If only one or two stages operate these inductors with few windings will saturate and will take very little energy away from the primary current. Also, since the cores saturate as the interrupter is coming open or resisting, there is a very limited amount of power that the interrupter has to interrupt. Thus, allowing the use of smaller interrupters that can operate fast.

When the device is called upon to operate, multiple interrupters of transformer pairs can be called upon to operate at the same time. If any of them operate ahead of time the above will take place with no major consequence. As they all interrupt we add the inductive impedance of each transformer pair and by adding more windings we bring the individual cores back below their saturation levels which in effect gives us more inductive impedance per transformer. The ones that open last will already have much less current flowing through them due to the inductive impedance of all of the others that have opened first. Likewise, there is not much voltage or stress across each of the interrupters after they have opened up.

The result is a good amount of inductive impedance for current control that can handle the power for a good amount of time. Any transformer/reactor affect such as heating, structural deformation, or insulation breakdown is not a problem because each transformer/inductor stores only a small amount of power compared to the whole. Heat buildup is not localized, but spread out. Any surges or stored energy releases that take place can be dissipated in each transformer secondary circuit individually, and at much lower energy levels. The "spreading out" of the energy makes this device very reliable.

On the go-back any interrupters that close first are picking up very limited power, and any that close last would be picking up power from a saturated circuit, so no problems here.

Since we can operate as many stages as we like, we have the possibility to vary the inductive impedance to different values. If the controller is used as a circuit protector we can vary the impedance sequentially very fast, as to follow the current or energy sensed and keep it controlled, but not letting it fall below load value if the disturbance goes away. It would be somewhat like a control circuit with feedback. If there is a false alarm like a spike or high current of short duration then only one or two of the stages might operate, and these will saturate with very little effect on the power system.

If the device is being used as a controller of load flow or other parameters, then it can be varied as needed and, again, with fast response if needed. When used in this mode, any heating or surges that take place can be dissipated in individual transformers or stages, just as stated before. Therefore each stage will just be dealing with a small amount of energy, as compared to the whole.

Built into this modular design is the fact that secondaries of individual stages can be isolated and taken out of service without affecting the rest of the controller. The controller could remain in service while an interrupter is tested or replaced, the interrupter being the most dynamic and the most sensitive part, and most likely to fail.

Description—Alternative Embodiment #1

In an alternative embodiment, as opposed to using saturating cores, we use non-saturating cores in the transformers. Here we increase the number of primary windings to account for the lack of magnetism in the core, but we still use few enough windings such that the operation of single stages have minimal affect on the primary current. If we use an air core, then we interlace the primary and secondary windings (FIG. 7) such that there will be maximum coupling between them. Under this embodiment, if a more resistive impedance is desired instead of inductive we could use more resistive components as the interrupters.

Operation—Alternative Embodiment #1

Since core saturation does not take place in this embodiment we only want to produce a small amount of inductive impedance when individual stages operate. The device would operate almost identically as in the preferred embodiment, except we could introduce slightly more impedance when the first stages operate and for failure of an interrupter, since the cores don't saturate. Also, the operation of consecutive stages in the beginning would add impedance more linearly, again since the cores don't saturate.

Description—Alternative Embodiment #2

Another embodiment is illustrated in FIGS. 4, 5, & 6. In this embodiment the interrupter (Again, the interrupter can be any device that interrupts or provides resistance or impedance itself) is connected just across the secondary of each transformer, instead of connecting to another transformer with opposite polarity. We just have the interrupter across the secondary of the transformer and the transformer core can be of either type mentioned before (saturating or non-saturating). This would then constitute a stage of the current controller. We do away with two transformers worth of impedance for every interrupter, but we can use larger transformers so that each of them impedes more.

Operation—Alternative Embodiment #2

In this embodiment when the interrupters are in the closed or non-resisting mode we provide a dead short across the secondaries of each transformer. This provides no impedance across the primaries and normal current flow is allowed. Upon operation of the interrupters we start to provide inductive impedance across the primary, with the cores saturating on the first ones that operate (or providing little impedance if non-saturating cores are used). Upon operation of several interrupters we then provide significant impedance across the primary. All other aspects would be the same as in the preferred embodiment described earlier, except stages operate as single transformer circuits instead of transformer pairs.

Conclusion, Ramifications, and Scope

In conclusion the reader can see that the power system controller described in this invention has the unique feature that it takes the energy out of or impedes the primary energy flow in small pieces, such that each piece is much more manageable and we can manipulate it quite well. Operation of each stage on its own has a minimal effect on the power system. It is not until multiple stages operate that the controller has a more noticeable affect. Built into this design come tremendous reliability and maintainability advantages. All these features make this controller better than any prior art.

While only a couple of embodiments are exemplified in the previous description with certain specifics about each, this in no way should put limitations on the scope of this invention. As may have been touched on previously, many variations are possible. For example:

We could use any device or combination of devices as the interrupter in the secondary circuit. The interrupters on each stage could be totally independent or one could be dependant on another to operate. A common operation mode would be to operate the stages in sequence following some pattern dictated by a current sensing device, somewhat creating a control system with feedback. The interrupters could be remotely operated and locally be dependant or independent, or they could be remotely dependant or independent. They could be remotely operated as groups or individually.

We could use superconducting wires as the coils of the transformers and vary their size. The transformers consist of primary and secondary coils that are magnetically coupled and could be in any physical form that still allows transformation. The transformers used do not have to be immersed in oil or contain any certain core size or shape and a specific insulation level is not dictated. This is because each transformer only has to manipulate a small part of the total energy.

The core material could be one or any combination of different saturable and non-saturable materials, including the introduction of air gaps or where only part of the core is saturable. Like this we can control the point of saturation, etc.

The controller could be of modular design, such that stages or parts of stages could be added or removed easily.

Finally, the stages of a controller could vary in size and design within the controller such that operation of one stage could have a certain impedance and operation of another could have a different impedance. We could have stages of each of the different embodiments all combined in one controller.

It is hopefully conveyed to the reader that the specificities of the embodiments described should not determine the scope of this invention, but that the appended claims and their legal equivalents do.

What is claimed is:

1. A device for control of electric current, comprising: a plurality of stages, whereupon a stage consists of a primary coil and a secondary coil wound around a saturating core and magnetically coupled, and a primary coil and a secondary coil wound around another saturating core and magnetically coupled; said primary coils connected in series; said secondary coils connected in parallel via a means for fully or partially interrupting secondary current; under normal conditions some of the current flowing through a primary coil is diverted through the secondary circuit consisting of the secondary coils and reintroduced through another of the primary coils, producing no overall affect on primary current; upon operation of means for interrupting secondary current, the inductive impedance of both primary coils reduces the current flow through the primary coils; said stages connected in series via primary coil pairs and forming a primary section for coupling the device to electric circuit; operation of single stages causing their cores to saturate and producing low inductive impedance on the primary circuit; operation of multiple stages bringing individual cores out of saturation due to less voltage across each stage and producing higher inductive impedance on the primary circuit.

2. The device according to claim 1, wherein the secondary coil windings cover at least the area of the core covered by the primary windings.

3. The device according to claim 1, wherein one or more cores are made of a combination of saturating and non-saturating materials, thereby changing saturation level.

4. The device according to claim 1, wherein one or more coils are made of a superconducting material.

5. The device according to claim 1, wherein partial or complete stages are separated as modules, producing a modular design.

6. A device for control of electric current, comprising: a plurality of stages, whereupon a stage consists of one primary coil and one secondary coil wound around a saturating core and magnetically coupled, said secondary coil shorted across via a means for fully or partially interrupting secondary current; under normal conditions the primary coil is magnetically shorted out via the shorted secondary coil and there is no affect on any of the primary current; upon operation of means for interrupting secondary current, inductive impedance of the primary coil reduces the primary current; said stages connected in series via primary coils, and forming a primary section for coupling the device to electric circuit; operation of single stages causing their core to saturate and producing low inductive impedance on the primary circuit; operation of multiple stages bringing individual cores out of saturation due to less voltage across each stage and producing higher inductive impedance on the primary circuit.

7. The device according to claim 6, wherein the secondary coil windings cover at least the area of the core covered by the primary windings.

8. The device according to claim 6, wherein one or more cores are made of a combination of saturating and non-saturating materials, thereby changing saturation level.

9. The device according to claim 6, wherein one or more coils are made of a superconducting material.

10. The device according to claim 6, wherein partial or complete stages are separated as modules, producing a modular design.

11. A device for control of electric current, comprising: a plurality of stages, whereupon a stage consists of a primary coil and a secondary coil wound around a non-saturating core and magnetically coupled, and a primary coil and a secondary coil wound around another non-saturating core and magnetically coupled; said primary coils connected in series; said secondary coils connected in parallel via a means for fully or partially interrupting secondary current; under normal conditions some of the current flowing through a primary coil is diverted through the secondary circuit consisting of the secondary coils and reintroduced through another of the primary coils, producing no overall affect on primary current; upon operation of means for interrupting secondary current, the inductive impedance of both primary coils reduces the current flow through the primary coils; said stages connected in series via primary coil pairs, and forming a primary section for coupling the device to electric circuit; operation of single stages producing low inductive impedance on the primary circuit; operation of multiple stages producing higher inductive impedance on the primary circuit.

12. The device according to claim 11, wherein the secondary coil windings cover at least the area of the core covered by the primary windings.

13. The device according to claim 11, wherein one or more cores are made of a combination of non-saturating materials, thereby changing the magnetic coupling between primary and secondary coils.

14. The device according to claim 11, wherein one or more cores are air cores.

15. The device according to claim 14, wherein those cores that are air cores have their primary and secondary windings interlaced.

16. The device according to claim 11, wherein one or more coils are made of a superconducting material.

17. The device according to claim 11, wherein partial or complete stages are separated as modules, producing a modular design.

18. A device for control of electric current, comprising: a plurality of stages, whereupon a stage consists of one primary coil and one secondary coil wound around a non-saturating core and magnetically coupled, said secondary coil shorted across via a means for fully or partially interrupting secondary current; under normal conditions the primary coil is magnetically shorted out via the shorted secondary coil and there is no affect on any of the primary current; upon operation of means for interrupting secondary current, inductive impedance of the primary coil reduces the primary current; said stages connected in series via primary coils and forming a primary section for coupling the device to electric circuit; operation of single stages producing low inductive impedance on the primary circuit; operation of multiple stages producing higher inductive impedance on the primary circuit.

19. The device according to claim 18, wherein the secondary coil windings cover at least the area of the core covered by the primary windings.

20. The device according to claim 18, wherein one or more cores are made of a combination of non-saturating materials, thereby changing the magnetic coupling between primary and secondary coils.

21. The device according to claim 18, wherein one or more cores are air cores.

22. The device according to claim 21, wherein those cores that are air cores have their primary and secondary windings interlaced.

23. The device according to claim 18, wherein one or more coils are made of a superconducting material.

24. The device according to claim 18, wherein partial or complete stages are separated as modules, producing a modular design.

* * * * *